Oct. 4, 1927.

W. E. HOYLER 1,644,525

CIRCUIT PROTECTING SYSTEM

Filed Oct. 17, 1925　　4 Sheets-Sheet 4

Willard E. Hoyler, INVENTOR.

BY

Geo. P. Kimmel, ATTORNEY.

Patented Oct. 4, 1927.

1,644,525

UNITED STATES PATENT OFFICE.

WILLARD E. HOYLER, OF BUFFALO, NEW YORK.

CIRCUIT-PROTECTING SYSTEM.

Application filed October 17, 1925. Serial No. 63,164.

This invention relates to a circuit protecting system, and has for its object to provide, in a manner as hereinafter set forth, a system of such class for controlling overloading and short circuiting and further for eliminating the burning out and changing of burned fuses as well as preventing the burning of current carrying conductors when the line is overloaded or shorted.

A current protecting system, in accordance with this invention, is designed primarily to eliminate the trouble of changing burned fuses, as the system will give the circuit the same protection as that obtained from a fuse, i. e., turn off the current when an overload or short circuit occurs.

In the circuits now used for house wiring or running motors in factories, etc., if an overload or short circuit in the line occurs, an excess amount of current flows and if it is not cut off immediately the wires of the house, motors, etc., become red hot and melt. A fuse interposed in the circuit will melt first, however, before such wires, and this shuts off the current. Then it is necessary to go to the meter board or cutout box and replace the burned out fuse with a new one, and if the overload or short circuit is not removed from the line the newly installed fuse will blow out immediately, and if the cover of the fuse is not tight, the flame from the fuse blowing will injure the party putting the fuse in. This has often happened to experienced persons who place a new fuse in position.

A system in accordance with this invention, interposed in the line, will shut off the current when the line is overloaded or shorted, then will turn the current back on when the overload or short is removed. This operation is accomplished automatically and no one is required to expose himself to the danger or inconvenience of going to the meter board or cutout box to position a new fuse. The system will be a great help to the housewife who uses current for many operations day and night. In factories where electric power is used, the system will cut off the current when a machine is overloaded or shorted and all the operator has to do is to turn off the power and the system will turn the current on again. This saves the operator a trip to the meter board or cutout box and further saves him from exposure to high pressure currents.

This system can also be used on automobiles as a cutout to save the electric bulbs from blowing out, when an excess current comes from the generator through a faulty ground wire. It will also save the wiring system from damage of an overload or chafed wire shorting.

The system can be used on a generator to cut out an excess current from the line and restore the main line switch when the current is again normal. The system has many other usages but all on the same principle for cutting off current from circuit when the circuit is overloaded or shorted, and then restoring the circuit to normal.

Further objects of the invention are to provide, a current protecting system, in a manner as hereinafter set forth and which is simple in its construction and arrangement, durable, compact, thoroughly efficient in its use, readily installed, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
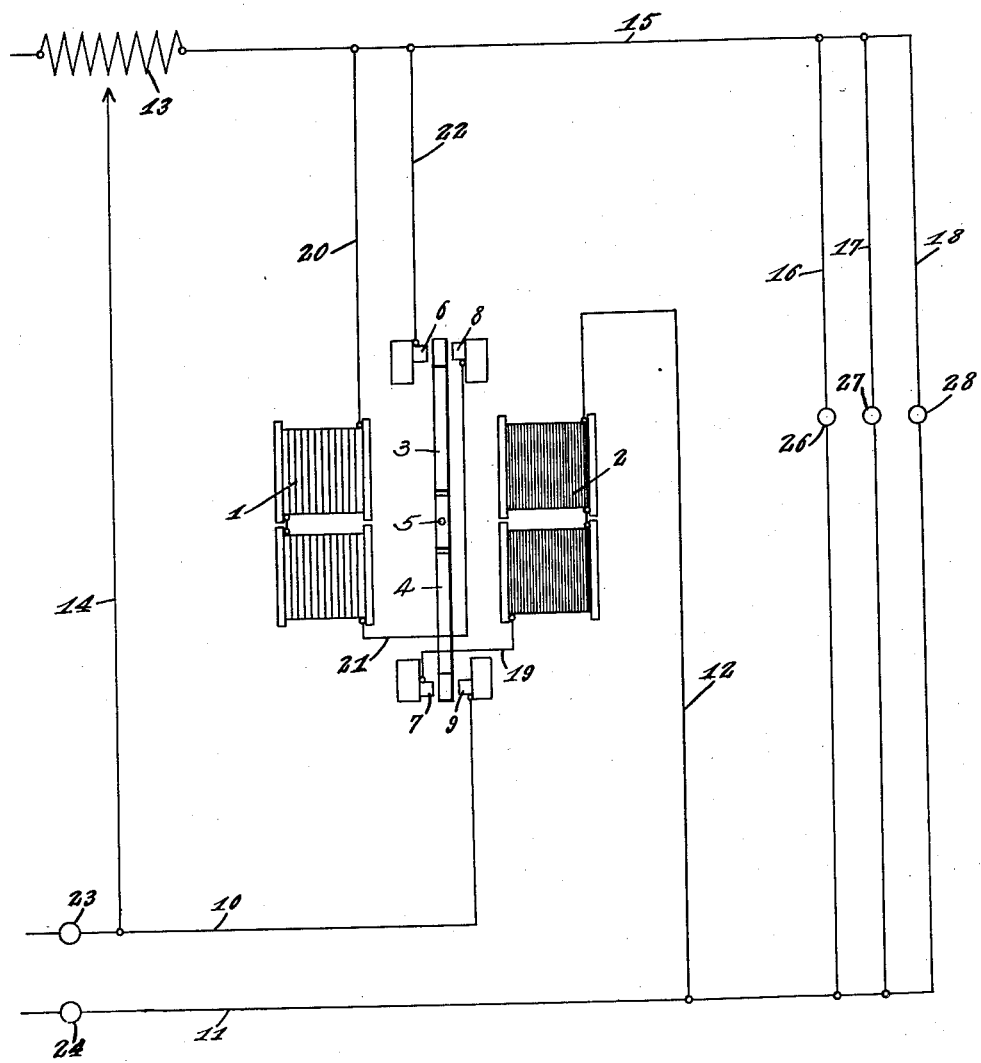
Figure 1 is a diagrammatic view illustrating the circuit arrangement in connection with a circuit protecting system in accordance with this invention.
Figure 2:
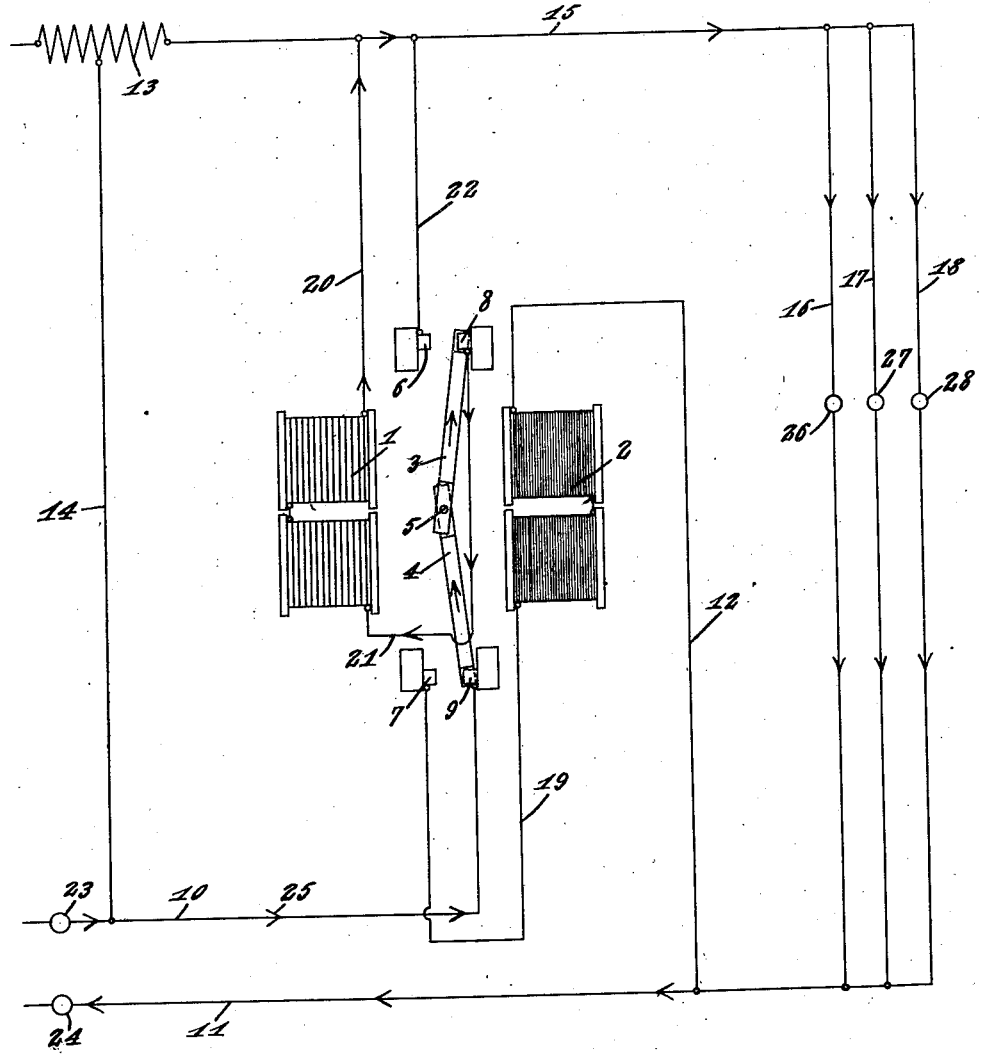
Figure 2 is a diagrammatic view of a circuit protecting system, in accordance with this invention, and showing the adaptation thereof with respect to a line and the path of current when the line is normal.

The circuit protecting system comprises a switch consisting of a solenoid magnet 1 wound with few coils of heavy wire, according to the voltage used, so that opposite poles are north and south, a solenoid magnet 2 wound with hundreds of coils of fine wire, according to voltage used, so as to form north and south poles, a pair of blades 3, 4, pivotally connected at their inner ends, as at 5, and which cooperate with the contacts 6, 7, 8 and 9. The construction of the switch can be that as disclosed in my copending application, Serial Number 63,164, filed Oct. 17, 1925, but it is obvious that any form of switch capable of operating to obtain the purpose of the invention can be employed. In Figure 2 the blades 3 and 4 are illustrated as in engagement with the contacts 8 and 9 when load in the line wires is normal.

The line wires are indicated at 10 and 11 and the former leads to the contact 9 and the latter by a branch 12 to one side of the solenoid 2. Leading from the line 10 to a variable resistance 13 is a branch 14. Leading from the variable resistance 13 is a branch 15 which terminates in a plurality of load branches 16, 17, 18, which extend to the line 11. Leading from the contact 7 to the side of the solenoid 2 is a branch 19. Leading from the branch 15 to one side of the solenoid 1 is a branch 20, and leading from the other side of the solenoid 1 to the contact 8 is a branch 21. Leading from the branch 15 to the contact 6 is a branch 22. If desired, fuses 23, 24 can be interposed in the line wires 10 and 11 for additional safety.

With respect to Figure 2, the path of current when load is normal is indicated by the arrows 25 and is as follows:—

Line wire 10, contact 9, blades 4, 3, contact 8, branch 21, solenoid 1, branches 20, 15, branches 16, 17 and 18, lamps or other devices 26, 27, 28 and line wire 11. The solenoid 1 is weak, as it has only a few coils of heavy wire. No current flows through resistance 13 because of its high resistance, and practically no resistance by the solenoid 1.

Figure 3:
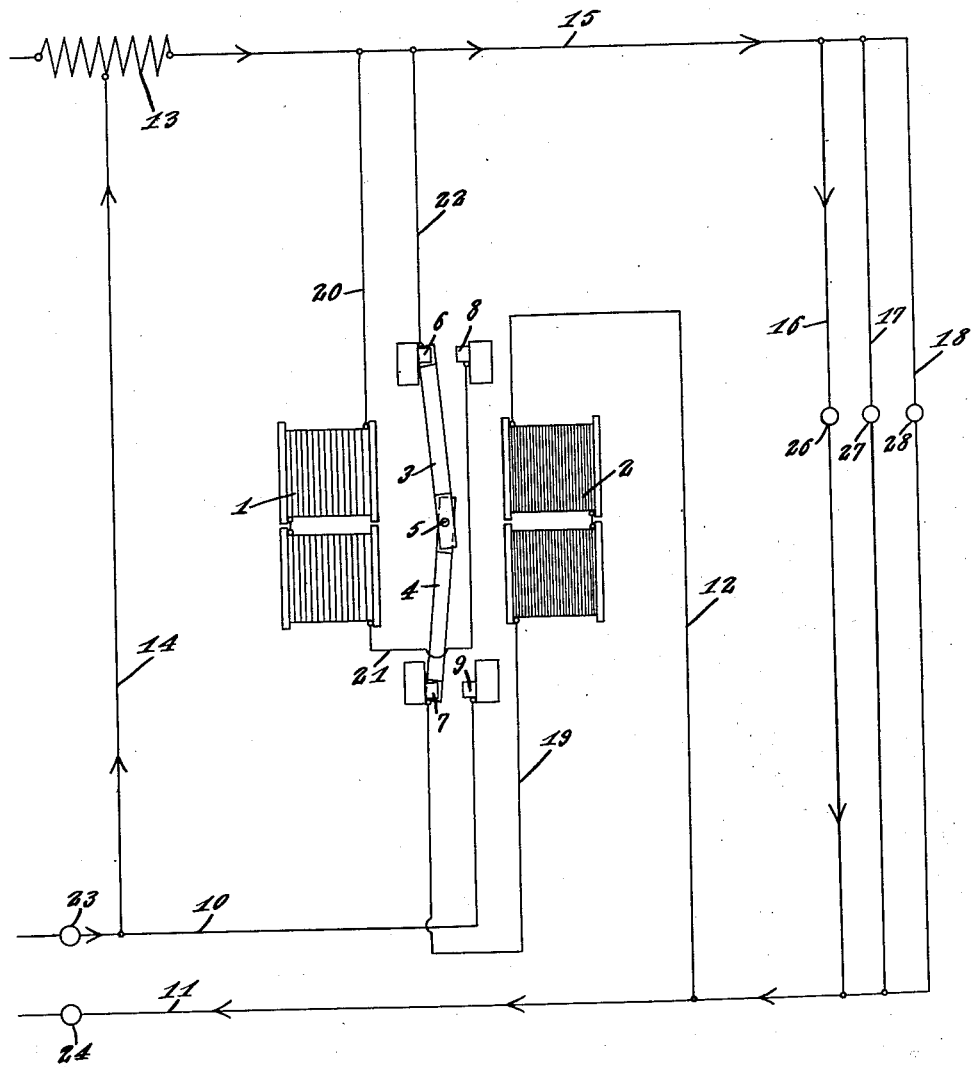
Figure 3 is a diagrammatic view of a circuit protecting system, in accordance with this invention, and showing the adaptation thereof with respect to a line and showing the path of current when the line is overloaded or short circuited.

Figure 3 illustrates the path of current when short or overload occurs, and at this time solenoid 1 becomes strong and acts on the blades 3, 4, and shifts them to engage contacts 6, 7, and which diverts the current through resistance 13 and which cuts the current down to a feeble amount. The feeble current can now go through blades 4, 3 and then through solenoid 2 to line wire 11, or it can pass by branch 14 to resistance 13, branch 15, branch 16, to return line 11. As solenoid 2 is wound with many coils of fine wire, it offers high resistance to feeble current so that the feeble current goes through short circuit or oveload. The solenoids 1 and 2, are therefore, substantially dead while the short circuit or overload remains in load and the system remains as is shown in Figure 3.

Figure 4:
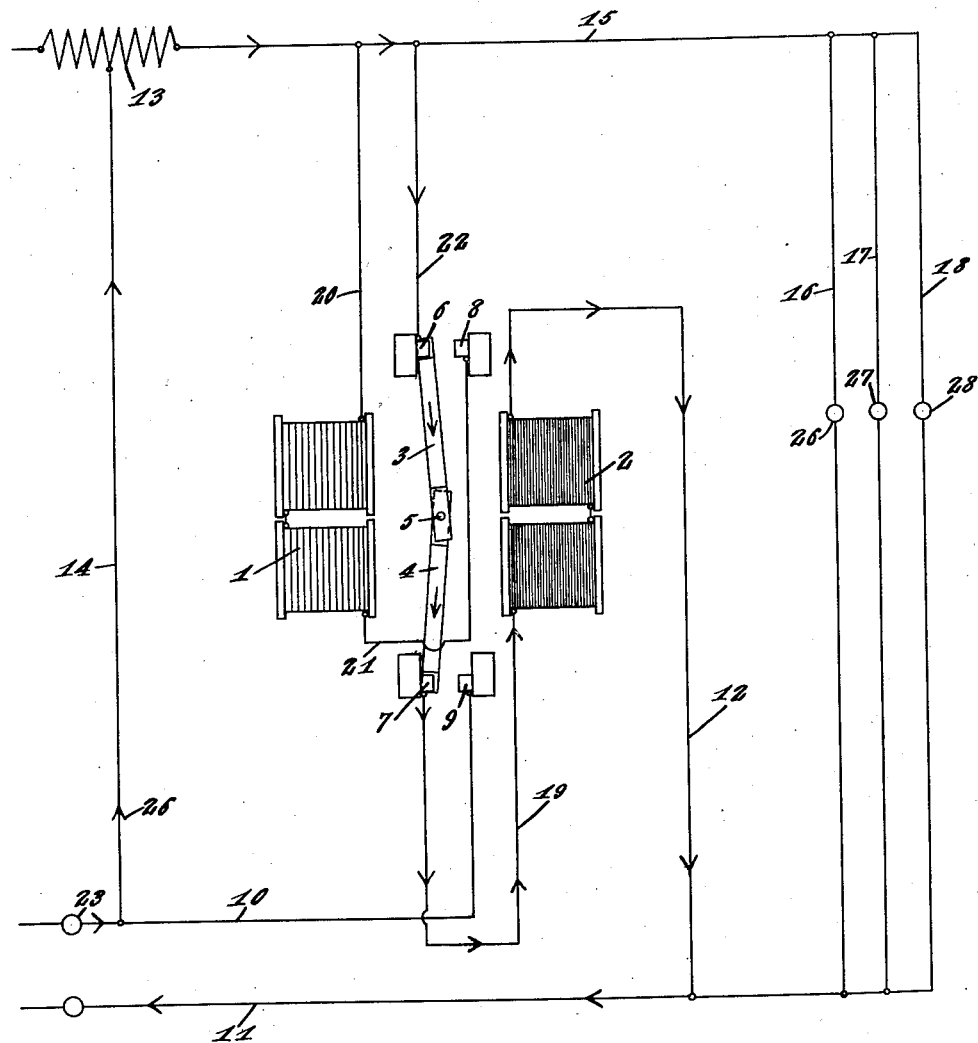
Figure 4 is a diagrammatic view of a circuit protecting system, in accordance with this invention, and showing the adaptation thereof with respect to a line and the path of the current when the short circuit or overload is removed.

With reference to Figure 4, the path of current is illustrated when short circuit or overload is removed and the travel of the current is indicated by the arrows 26. When short circuit or overload is removed, the feeble current from resistance 13 travels through blades 3, 4, branch 19 to solenoid 2, and as the latter has less resistance than normal load it becomes energized and shifts the blades 3, 4 to the position shown in Figure 2 and the system is in position for normal load.

The system provides means whereby a solenoid magnet will cut off heavy current and send a feeble current through the line to the short or overload and then divert said feeble current through another solenoid magnet when overload or short is removed from the line, and the said second solenoid magnet will actuate the switch and restore the system to normal working conditions, and by such operation overloading and short circuiting is controlled, the circuit protected, and the system provides means for eliminating the burning out and changing of burned fuses as well as preventing burning of current carrying conductors when the line is overloaded or shorted.

It is thought that the many advantages of a current protecting system, in accordance with this invention, can be readily understood, and although the preferred embodiment of the system is as illustrated and described, yet it is to be understood that changes in the arrangement of the system can be had which will fall within the scope of the invention as claimed.

What I claim is:—

1. A protecting system for a main line circuit comprising means for automatically cutting off the heavy current from the circuit when overloaded or shorted and sending a feeble current to the overload or short until the latter is removed, and further for passing a feeble current of a value through a switch closing coil for automatically restoring the circuit to normal condition after the overload or shorting has been removed, said means including a switch having the closed and open positions thereof maintained entirely independent of the said feeble currents, and said means so arranged that no movement of said switch occurs if power is shut off during a short or overload period or when the line is normal.

2. A protecting system for a main line circuit when shorted or overloaded comprising means interposed in the main line circuit and including a variable resistance and a magnetic switch including an opening and a closing coil, said means providing for cutting off the heavy current when the main line circuit is overloaded or shorted, and sending a feeble current to the short or overload until the latter is removed, and further for passing a feeble current of a value through said closing coil, when the overload or short is removed, to close said device to restore the main line circuit to normal conditions, said first feeble current travelling only through the short or overload as the latter is the line of least resistance, and said means so arranged that no movement of said switch occurs if power is shut off during a short or overload or when the line is normal.

3. A protecting system for a main line circuit when shorted or overloaded comprising means interposed in the main line circuit and including a variable resistance and a switching device having a pair of solenoid magnets, one of comparatively low resistance and the other of comparatively high resistance for cutting off the heavy current and sending a feeble current when the main line circuit is overloaded or shorted to the short or overload until the latter is removed, and then utilizing said feeble current when the overload or short is removed, to close said device to restore the main line circuit to normal condition, the elements of said means so arranged to prevent movement of the magnetic switch if power is shut off therefrom during a short or overload.

4. A protecting system for a main line circuit when shorted or overloaded comprising means interposed in the main line circuit and including a magnetic switch having a solenoid magnet for cutting off a heavy current and sending a feeble current when the main line is overloaded or shorted through the main line to the short or overload, and further having another solenoid magnet for utilizing a feeble current when the overload or short is removed from the main line to close said switch to restore the main line circuit to normal conditions, said feeble current not acting to hold the switch opened or closed during a short or overload period but is diverted through the high resistance magnet after the short or overload is removed to pull the switch closed, and further said feeble current not acting to maintain the switch closed during a normal period of the line.

5. In a protecting system for a main line circuit when shorted or overloaded a shiftable circuit opening and closing element, springs connected therewith for holding said element in either circuit opening or circuit closing positions and for completing, after being initially shifted, the movement of said elements to either circuit opening or closing positions, said springs further acting to prevent movement of said elements if power fails or is shut off, whether the line be normal, shorted or overloaded or no load, means for initially shifting said element from closed to open positions magnetically on the introduction of a short or overload in the main line, and means for shifting said element initially from open to closed position when short or overload is removed from the main line.

6. In a protecting system for a main line circuit constructed in accordance with claim 5, said springs imparting a snapping action to said element to quickly complete the travel thereof after its initial start.

In testimony whereof, I affix my signature hereto.

WILLARD E. HOYLER.